United States Patent [19]

Ratkowski et al.

[11] Patent Number: 4,661,573

[45] Date of Patent: Apr. 28, 1987

[54] LENS COMPOSITION ARTICLES AND METHOD OF MANUFACTURE

[75] Inventors: Donald J. Ratkowski, Mesa; William J. Burke, Tempe, both of Ariz.

[73] Assignee: Paragon Optical Inc., Mesa, Ariz.

[21] Appl. No.: 851,929

[22] Filed: Apr. 14, 1986

[51] Int. Cl.$^4$ ............................................. C08F 20/24
[52] U.S. Cl. ................................ 526/245; 351/160 R; 351/160 H; 523/107
[58] Field of Search ................... 526/245; 351/160 R, 351/160 H; 523/107

[56] References Cited

U.S. PATENT DOCUMENTS

| | | | |
|---|---|---|---|
| 4,525,563 | 6/1985 | Shibata et al. | 526/245 |
| 4,540,761 | 9/1985 | Kawamura et al. | 526/245 |
| 4,575,545 | 3/1986 | Nakos et al. | 526/245 |
| 4,575,546 | 3/1986 | Klemarczyk et al. | 526/245 |

Primary Examiner—Paul R. Michl
Attorney, Agent, or Firm—Richard R. Mybeck

[57] ABSTRACT

New copolymer composition, methods for processing the copolymers into optical devices and articles resulting therefrom, especially intraocular and contact lenses having outstanding extended wear and daily wear properties. The composition comprises, in weight percent: from 3% to 35% polyfluoroalkyl acrylate; from 45% to 65% acryloxyalkylpolysiloxane; 1% to 15% acryloxyalkylsilanol; 2% to 20% polyacryloxyalkylpolysiloxane; 2% to 15% polyol polyacrylate and 2% to 15% polymerizable ethylenically unsaturated monomeric wetting agent such as acrylic acid. The composition may also contain 0 to 15% acrylic acid ester of a monohydric alcohol having no more than 20 carbon atoms and from 0.05% to about 2.0% of a free radical initiator.

33 Claims, No Drawings

LENS COMPOSITION ARTICLES AND METHOD OF MANUFACTURE

INTRODUCTION

The present invention relates to new and unique copolymer compositions, methods for processing said copolymers to form them into optical devices, especially contact lenses or blanks from which contact lenses and other biomedical devices may be shaped, and to the buttons, lenses and other articles resulting therefrom.

More particularly, the present invention relates to novel copolymer compositions having distinctly improved oxygen permeability while providing the hardness, mechanical stability, wettability, and optical clarity essential for optical lenses, including intraocular and contact lenses, or the buttons and blanks from which such lenses may be shaped. The buttons or blanks can be formed by either conventional forming techniques, by injection molding or by compression casting.

Furthermore, this invention concerns hard, oxygen-permeable copolymers from which contact lenses and the like can be produced which lenses have outstanding extended wear or daily wear properties. In addition, these copolymers can be used to manufacture contact lenses by industry-standard manufacturing techniques as well as by injection molding or casting. Such lenses can be cleaned with standard contact lens cleaning solutions without any special surface treatments to impart wettability. For purposes of the following discussion, this invention will be described in terms of contact lenses although it is readily applicable to other optical lenses and other biomedical devices.

BACKGROUND OF THE INVENTION

So-called "hard" contact lenses and compositions for fabricating them are well known in the art. The standard contact lens used for many years was fabricated from poly(methyl methacrylate) (PMMA) and achieved widespread use throughout the world, despite the fact that a PMMA lens is essentially impermeable to oxygen. The lack of oxygen at the interface between the contact lens and the cornea will, after even short periods of time, i.e., less than one day, cause discomfort to the wearer because of edema induced by the lack of oxygen at the surface of the cornea. Consequently, PMMA lenses must be removed at least daily and preferably more often to expose the surface of the cornea to ambient atmospheric oxygen and thereafter replaced, a bothersome procedure.

In attempts to remedy the inherent defects in the standard poly(methyl methacrylate) lenses, numerous polymer compositions have been developed which have demonstrated improved oxygen permeability thus permitting the user to wear the contact lenses for a longer period of time. Polymers used to obtain an improvement in oxygen permeability of contact lenses include: soft, crosslinked poly(hydroxyethyl methacrylate); silicone rubber; cellulose acetate butyrate; and methyl methacrylate copolymers with methacrylpolysiloxane and other comonomers.

Soft hydrogel lenses, such as those formed from crosslinked poly(2-hydroxyethylmethacrylate), have a high water content and are in general more comfortable to wear than PMMA lenses in view of their softness and increased oxygen permeability. As a result of their water content, however, they inherently have a limited oxygen permeability and lack the necessary dimensional stability required for a high degree of visual acuity. Moreover, they are fragile and have a tendency to become cloudy because of the ease with which proteinaceous material and other contaminants are deposited thereupon.

Contact lenses formed from cellulose acetate butyrate have been found to have a higher oxygen permeability than those formed from poly(methyl methacrylate) but in turn suffer from a lack of dimensional stability, which results in an undesirable degree of warpage, and lack the hardness required for resistance to scratching. Soft contact lenses prepared from silicone rubber have very high oxygen permeability but poor mechanical properties and cannot be lathe cut. Further as a result of their very low wettability, they tend to attract and hold contaminants and thus prevent the ready removal of toxic products by tears. Such deficiencies have curtailed their commercialization.

Copolymers of methyl methacrylate and poly(fluoroalkyl) methacrylates have been disclosed by Cleaver (U.S. Pat. No. 3,950,315) and copolymers from methyl methacrylate and methacryloxyalkylpolysiloxanes have been described by Gaylord (U.S. Pat. No. 4,120,570), Ratkowski (U.S. Pat. No. 4,535,138) and others. Compared with contact lenses formed from PMMA, contact lenses prepared from the methyl methacrylate copolymers of Gaylord and Ratkowski, supra, offer significantly greater but still limited oxygen permeability. A summary of related art is set forth in Keogh (U.S. Pat. No. 4,259,467) and need not be repeated here.

Ichinohe (U.S. Pat. No. 4,433,125) and Kawamura (U.S. Pat. No. 4,540,761) describe hard contact lens materials made from copolymers of fluoroalkyl methacrylates and methacryloxyalkylsiloxanes which provide a somewhat greater oxygen permeability than earlier methacrylate copolymers described in the art but even the values obtained are still considerably below that desired for a safe, comfortable extended-wear lens.

Rice et al (U.S. Pat. No. 4,440,918) disclose ophthalmic devices prepared from polymers and copolymers derived from telechelic perfluoropolyethers. Certain of these materials have an unusually high oxygen permeability but have the disadvantage of being so soft that they cannot be lathe cut. Copolymers of telechelic perfluoroethers with sufficient methyl methacrylate or other polymerizable materials to provide the hardness required for lathe cutting, however, have greatly reduced oxygen permeability.

Although the hard oxygen permeable contact lenses available up to now represent a marked improvement over standard PMMA lenses, they still lack the degree of oxygen permeability required for safe and comfortable extended wear. Further, the currently available hard oxygen permeable contact lenses have certain disadvantages in comparison with PMMA lenses in terms of mechanical strength, durability, dimensional stability and wettability.

SUMMARY OF THE INVENTION

From the foregoing, it is apparent that a definite need exists for the creation of a composition from which hard, highly oxygen permeable contact lenses can be formed which will be safe and comfortable to wear over an extended period of time and which are durable, readily wettable by tears, have excellent optical properties and the dimensional stability required for superior visual acuity. Furthermore, it would be especially advantageous if such composition comprised a polymeric material which is capable of being handled by standard procedures, such as bulk polymerization, lathe cutting, casting and injection molding in the process of producing high quality optical devices therefrom.

This disclosure is based upon the discovery of a unique copolymer composition which permits the manufacture of contact lenses having the outstanding combination of properties listed above using standard manufacturing procedures, thereby achieving a long sought goal in the art.

Accordingly, a prime object of the present invention is to provide a new and improved copolymer composition which is especially useful for the manufacture of contact lenses having an outstanding combination of desirable properties not heretofor achieved in the art.

Another objective of the present invention is to provide a new and improved optical lens composition from which lenses can be fabricated using standard production methods as well as by injection molding and casting and which require no special surface treatment to achieve efficacious use.

A further object of the present invention is to provide a new and improved composition for the fabrication of optical lenses having high oxygen permeability coupled with superior toughness, dimensional stability, clarity, durability, hardness and wettability.

Still a further object of the present invention is to provide a new and improved extended wear and daily wear optical lens composition which is capable of producing contact lenses which have and retain their optimum physical properties while being readily formed into a variety of optical shapes.

These and still further objects as shall hereinafter appear are readily fulfilled by the present invention in a remarkably unexpected manner as will be readily discerned from the following detailed description of an exemplary embodiment thereof.

DESCRIPTION OF PREFERRED EMBODIMENTS

The composition of the present invention comprises a unique combination of copolymers derived from comonomers. The composition contains in weight percent, the following essential components: 3% to 35% of a polyfluoroalkyl acrylate, 45% to 65% of an acryloxyalkylpolysiloxane, 1% to 15% of an acryloxyalkylsilanol, 2% to 20% of a polyacryloxyalkyl polysiloxane, 2% to 15% of a polyol polyacrylate, and 2% to 15% of a polymerizable, ethylenically unsaturated monomeric wetting agent such as acrylic acid.

Up to 15% of any alkyl acrylate may be included in the copolymer mixture as an optional comonomer. The percentages given in this specification are by weight. In the interest of clarity and brevity, for the purpose of this specification it will be understood that the term acrylic includes methacrylic; acrylate includes methacrylate; and acryloxy includes methacryloxy.

This invention further includes as new articles of manufacture contact lenses and other biomedical devices which are fabricated from the unique copolymer composition described above. These contact lenses and the like can be produced by forming a button or blank, by injection or compression molding; or by casting in a mold to the desired shape and thereafter cutting the button or blank with a lathe.

The polyfluoroalkyl acrylate monomers used in this invention make up from 3% to 35% of the comonomer polymerization mixture and have the general formula

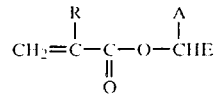

where R=H or CH$_3$; A=H or E; E is a polyfluoroalkyl group having no more than 20 fluorine atoms; and the monomer contains no more than 20 fluorine atoms.

Suitable fluoroalkyl acrylates for use in this invention include: 2,2,2-trifluoroethyl methacrylate, hexafluoroisopropyl methacrylate; 1,1-dihydroperfluoro-2,2-dimethylpropyl acrylate; 1,1-dihydroperfluorobutyl methacrylate; 1-trifluoromethylethyl acrylate; nonafluorocyclohexyl acrylate; 1,1-dihydroperfluorooctyl methacrylate; 2,2,3,3-tetrafluoropropyl methacrylate; 1,1-dihydroperfluoropropyl acrylate; 1,1-dihydroperfluorononyl methacrylate; 2-(N-ethylperfluorooctanesulfamido)ethyl methacrylate; and 2,2,2-trifluoroethyl-α-carboxymethyl acrylate. Particularly preferred fluoroalkyl acrylates include 2,2,2-trifluoroethyl methacrylate and 1,1 dihydroperfluorobutyl methacrylate. The fluoroalkyl acrylates contribute effectively to the strength, durability and resistance to surface deposits of the copolymers. Particularly good results are obtained when the polyfluoroalkyl acrylate is present in the comonomer mixture in the range of from about 8 to about 25% by weight, which range is preferred.

The copolymerization mixture of the present invention contains from 45% to 65% by weight of an acryloxyalkylpolysiloxane which has the general structure:

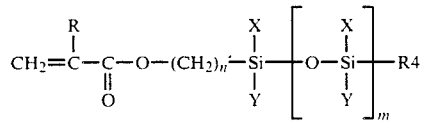

Wherein:
R=CH$_3$- or H-;
X=C$_1$-C$_6$ alkyl, cyclohexyl, phenyl or Z;
Y=C$_1$-C$_6$ alkyl, cyclohexyl, phenyl or Z;
Z=

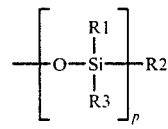

R1=C$_1$-C$_6$ alkyl, cyclohexyl, or phenyl; m=1-3;
R2=C$_1$-C$_6$ alkyl, cyclohexyl, or phenyl; n=1-5;
R3=C$_1$-C$_6$ alkyl, cyclohexyl, or phenyl; p=1-3; and
R4=C$_1$-C$_6$ alkyl.

Preferred acryloxyalkylpolysiloxanes are: γ-methacryloxypropyl-tris(trimethylsiloxy)silane; γ-acryloxypropyl-tris(trimethylsiloxy)silane; and 5-methacryloxypropyl-1,1,1-trimethyl-3,3,5,5-tetrakis(trimethylsiloxy)-trisiloxane.

The inclusion of from about 45% to about 65%, by weight, of such acryloxyalkylpolysiloxanes in the copolymerization mixture is essential in order to obtain the high degree of oxygen permeability required for extended wear contact lenses. Use of appreciably more than 65% of the acryloxyalkylpolysiloxane can result in an undesirable softening of the copolymer, while use of appreciably less than 45% will not provide the desired high level of oxygen permeability. Particularly useful results are obtained with a concentration of 48% to 55% of the acryloxyalkylpolysiloxanes and this range is preferred.

The copolymerization mixture of the present invention further contains from about 1% to about 15% of acryloxyalkylsilanols which have the general structure:

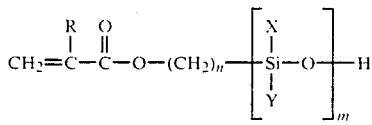

Wherein:
R = CH$_3$- or H-;
X,Y = C$_1$-C$_6$ alkyl, cyclohexyl, phenyl, or Z;
Z =

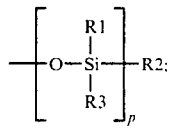

n = 1-5;
m = 1-3;
p = 1-3;
R1 = C$_1$-C$_6$ alkyl, cyclohexyl, or phenyl;
R2 = C$_1$-C$_6$ alkyl, cyclohexyl, or phenyl; and
R3 = C$_1$-C$_6$ alkyl, cyclohexyl, or phenyl.

Representative acryloxyalkylsilanols of this type include: bis(trimethylsiloxy)-γ-methacryloxypropylsilanol; methyl(trimethylsiloxy)-methacryloxymethylsilanol; methyl(trimethylsiloxy)-β-methacryloxyethylsilanol; methyl(trimethylsiloxy)-γ-methacryloxypropylsilanol; bis(trimethylsiloxy)-β-methacryloxyethylsilanol; bis(trimethylsiloxy)-methacryloxymethylsilanol; (trimethylsiloxy)-(pentamethyldisiloxanyl)-methacryloxymethylsilanol; (trimethylsiloxy)-(pentamethyldisiloxanyl)-β-methacryloxyethylsilanol; (trimethylsiloxy)-(pentamethyldisiloxanyl)-γ-methacryloxypropylsilanol The presence of from about 1% to about 15% of an acryloxyalkylsilanol in the copolymerization mixture results in copolymers having increased dimensional stability and improved wettability and hardness.

The di(acryloxyalkyl)polysiloxanes used in this invention are present in the range of from about 2% to about 20%, and preferably from about 3% to about 15%, by weight, of the copolymerization mixture. The di(acryloxyalkyl)polysiloxanes have the general structure:

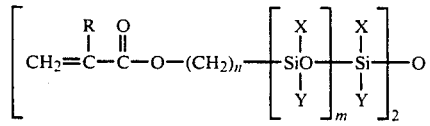

Wherein:

R = CH$_3$- or H-;
m = 0-3;
n = 1-5;
X = C$_1$-C$_6$ alkyl, cyclohexyl, phenyl or Z;
Y = C$_1$-C$_6$ alkyl, cyclohexyl, phenyl or Z;
Z =

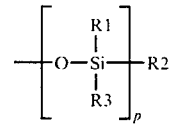

p = 1-3;
R1 = C$_1$-C$_6$ alkyl, cyclohexyl, or phenyl;
R2 = C$_1$-C$_6$ alkyl, cyclohexyl, or phenyl; and
R3 = C$_1$-C$_6$ alkyl, cyclohexyl, or phenyl.

Preferred bis(acryloxyalkyl)polysiloxanes are: 1,3-bis(methacryloxypropyl)-1,1,3,3-tetrakis(trimethylsiloxy)-disiloxane; 1,3-bis(acryloxymethyl)-1,1,3,3-tetrakis(trimethylsiloxy)-disiloxane; 1,3-bis(methacryloxypropyl)-1,1,3,3-tetrakis(triethylsiloxy)-disiloxane; and 1,5-bis(methacryloxymethyl)-1,1,3,3,5,5-hexa(trimethylsiloxy)-trisiloxane. The use of di(acryloxyalkyl)polysiloxanes in the copolymerization mixtures of this invention is essential in order to obtain enhanced dimensional stability along with a high degree of oxygen permeability.

It has been found that when from about 2% to about 20% of a di(acryloxyalkyl)polysiloxane is used in combination with about 2% to about 15% acrylic acid polyester of an alkylpolyol, unexpectedly superior results are obtained in contrast to results obtained when either type of crosslinking agent is used alone. Preferably, the use of from about 3% to about 15% of the polyacrylpolysiloxane in combination with from about 5% to about 12% alkylpolyol polyacrylate as crosslinking agents is particularly effective in providing polymers having excellent machinability and increased dimensional stability whereupon a lens produced therefrom possesses significantly enhanced visual acuity. Visual acuity is, of course, very important in the production of high quality contact lenses. It is noteworthy that these important physical improvements are obtained along with outstanding oxygen permeability through the use of the carefully controlled concentration of the polyacrylalkylpolysiloxane and the acrylate of an alkyl polyol.

Suitable monomeric polyol polyacrylates include: ethylene glycol dimethacrylate, trimethylolpropane triacrylate, diethyleneglycol dimethacrylate, glycerol trimethacrylate and tetramethyleneglycol dimethacrylate.

The use of from about 2% to about 15% of polymerizable ethylenically unsaturated hydrophyllic comonomers in the copolymerization mixture results in copolymers having improved surface wettability, increased hardness and greater resistance to warpage. Representative comonomers of this type, which may be used singly or in combination, include: acrylic acid; methacrylic acid; itaconic acid; N-vinylpyrrolidone; hydroxyethyl methacrylate; N-(1,1-dimethyl-3-oxybutyl)-2-acrylamide; glycerol monomethacrylate; N,N-dimethylaminomethyl methacrylate; 2-methoxyethyl acrylate; N,N-dimethylacrylamide; acrylamide and 2-carboxyethyl methacrylate. Unsaturated carboxylic acids having a terminal vinyl group, such as methacrylic acid, are particularly effective. The unsaturated carboxylic acids also impart a desirable increase in surface hardness and resistance to surface deposits. Superior results are obtained when a total of from about 5% to about 12% by weight of one or a combination of two or more of the polymerizable hydrophyllic monomers is used in our composition.

In contrast to the other siloxane acrylates used in this invention, namely the polysiloxyalkyl acrylates and the dimethacryloxyalkylpolysiloxanes, the acryloxyalkylsilanols have the characteristic SiOH moiety. The presence of the hydroxyl group attached to silicon makes possible the formation of hydrogen bonds between the chains of the copolymers. Such linkages are not possible with the other types of siloxane acrylates employed in this invention. The presence of an acryloxyalkylsilanol in the comonomer mixture thus contributes significantly to the dimensional stability of the resulting copolymer, which in turn curtails the tendency of thin contact lenses to incur undesirable warpage during normal wear. Moreover, the presence of the silanol in the comonomer mixture also contributes to the hardness and scratch resistance of the resulting copolymers without in any way detracting from the outstanding oxygen permeability. The concentration of the acryloxyalkylsilanol can be varied from about 1% to about 15% acryloxyalkylsilanol can be varied from about 1% to about 15% but preferably will be maintained between 3% and 13% to achieve the most desirable combination of properties.

While the use of alkylacrylates is not required to obtain the unique copolymers of the present invention, they can be useful in certain specified situations. These acrylates have the general formula

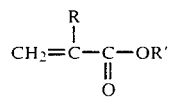

wherein R = H or $CH_3$ or $CH_2COOR'$; and R' is a hydrocarbon radical containing no more than 20 carbon atoms. The alkylacrylates can be used as an optional comonomer in proportions up to 15%, by weight, of the comonomer mixture. Such acrylates include: methyl methacrylate; stearyl methacrylate; cyclohexyl acrylate; isopropyl methacrylate; isoborynl acrylate; cyclopentadienyl methacrylate; phenyl acrylate; benzyl methacrylate; 2-methyl propyl methacrylate; isopropyl acrylate and methyl-α-carbomethoxy acrylate.

Use of a limited amount, not more than 15% and preferably not more than 10% of such acrylates in the comonomer mixture, results in an improvement in machinability, surface hardness and scratch resistance of the copolymers obtained. Use of more than 10% or 15% of such acrylate, however, results in an undesirable reduction in the oxygen permeability of the resulting copolymer. It is thus important that the concentration of the alkyl acrylate in the final mixture be carefully controlled if the desired balance of properties are to be obtained. Esters of other polymerizable ethylenically unsaturated carboxylic acids, such as methyl or isopropyl itaconate, can be used in place of the acrylate esters. Particularly good results are obtained using methyl methacrylate and isopropyl methacrylate and these acrylates are preferred.

Other vinyl monomers which readily copolymerize with poly(methyl methacrylate) may be used in place of part or all of the preferred acrylates or methacrylates described above. Suitable replacement vinyl monomers include styrene, α-methylstyrene, alkylated styrenes, diethyl itaconate, perfluoroethyl vinyl ether, isoprene, isobutylene, 4-methyl-1-pentene and chlorotrifluoro ethylene. Preferably these monomers have a molecular weight of less than 300.

The copolymers of the invention are prepared by mixing the individual comonomers with a suitable initiator. The preferred initiator is a free-radical-generating-polymerization-initiator of the type commonly used in polymerizing ethylenically unsaturated compounds. Representative of such free radical polymerization initiators are: 2,2'-azobis(isobutyronitrile); 2,2'-azobis(2,4-dimethylvaleronitrile); 2,2'-azobis(methylbutyronitrile); acetyl peroxide; lauroyl peroxide; benzoyl peroxide; tertiary-butyl peroxypivalate; diisopropyl peroxycarbonate; tertiary-butyl peroctoate; methyl ethyl ketone peroxide; di(2-phenoxyethyl)peroxydicarbonate; and di(2-phenoxyethyl)methyl ethyl ketone peroxide.

Conventional polymerization techniques are employed to produce the novel copolymers. The comonomer mixture containing between about 0.05-2% by weight of the free radical initiator is heated to a temperature between 30° C.–100° C., preferably below 70° C., to initiate and complete the polymerization.

The polymerization mixture can be heated in a suitable mold or container to form discs, rods or sheets which can then be machined to the desired shape using conventional equipment and procedures employed for fabricating lenses from poly(methyl methacrylate). The temperature is preferably maintained below 70° C. in order to minimize the formation of bubbles in the copolymer. Instead of employing the bulk polymerization techniques described above, one can employ solution, emulsion or suspension polymerization to prepare the novel copolymers, using techniques conventionally used in the preparation of polymers from vinyl functioning unsaturated monomers (-CH=$CH_2$), that is, ethenyl-functioning monomers. The copolymer thus produced may be pressed or molded into rods, sheets or other convenient shapes which are then cut into buttons and thereafter machined to produce the contact lenses. Alternatively, the copolymer can be directly cast or molded into finished contact lenses or lens blanks with plano, convex or concave surfaces or any desired combination thereof.

In a preferred practice of the present invention, the monomer mixture is thermally polymerized in an appropriate mold or vessel to provide a disc, sheet, rod, or plug, each of which may have a radius convex or radius concave or a plano surface, to provide a semifinished or finished contact lens or other optical lens. The mold and vessel utilized will be formed of polypropylene, polyethylene, nylon, Teflon ®, glass, or aluminum having its mold surface coated with Teflon ®. As will hereinafter appear, certain applications are well served using glass test tubes or rods as the forming mold.

The particular free radical polymerization initiator employed in accordance with the preferred practice of the invention is selected by reference to the required initiation temperature. Thus, if conventional polymerization techniques are employed to produce cast rods or other shapes which are then machined to produce the desired lenses, the preferred initiators are 2,2'-azobis-(isobutyronitrile), 2,2'-azobis(2,4-dimethylvaleronitrile), benzoyl peroxide, di(2-phenoxyethyl)peroxydicarbonate, t-butyl peroxyprivalate, and the like.

On the other hand, it it is desired to produce contact lenses or contact lens blanks by injection molding or direct casting, then a polymerization initiator having a higher initiation temperature may be employed in order to prevent premature polymerization in the injection molding or casting cavities. Such an initiator can be a mixture or methyl ethyl ketone peroxide and cobalt naphthenate.

In one practice of the present invention, a copolymerization mixture is prepared by mixing the following comonomers, in the relative weight ratios indicated, in a plastic container equipped with a conventional stirring and blending device.

The copolymerization mixture contains: a poly(fluoroalkyl acrylate) such as: 2,2,2-trifluoroethyl methacrylate, hexafluoroisopropyl methacrylate, 1,1-dihydroperfluoro-2,2-dimethylpropyl acrylate, 1,1-dihydroperfluorobutyl methacrylate, 1-trifluoromethylethyl acrylate, nonafluorocyclohexyl acrylate, 1,1-dihydroperfluorooctyl methacrylate, 2,2,3,3-tetrafluoropropyl methacrylate, 1,1-dihydroperfluoropropyl acrylate and 1,1-dihydroperfluorononyl methacrylate; and acryloxyalkylsilanol such as bis(trimethylsiloxy)-γ-methacryloxypropylsilanol, methyl(trimethylsiloxy)-methacryloxymethylsilanol, methyl(trimethylsiloxy)-β-methacryloxyethylsilanol, methyl(trimethylsiloxy)-γ-methacryloxypropylsilanol, bis(trimethylsiloxy)-β-methacryloxyethylsilanol, bis(trimethylsiloxy)-methylacryloxymethylsilanol, (trimethylsiloxy)-(pentamethyldisiloxanyl)-methacryloxymethylsilanol, (trimethylsiloxy)-(pentamethyldisiloxanyl)methacryloxymethylsilanol, and (trimethylsiloxy)-(pentamethyldisiloxanyl)-γ-methacryloxypropylsilanol; a polyacryloxypolysiloxane such as: 1,3-bis(methacryloxypropyl)-1,1,3,3-tetrakis(trimethylsiloxy)disiloxane, 1,3-bis(acryloxymethyl)-1,1,3,3-tetrakis(trimethylsiloxy)-disiloxane, 1,3-bis(methacryloxypropyl)-1,1,3,3-tetrakis(triethylsiloxy)disiloxane, and 1,5-bis(methacryloxymethyl)-1,1,3,3,5,5-hexa(trimethylsiloxy)trisiloxane trisiloxane; an acryloxyalkylpolysiloxane such as: γ-methacryloxypropyl-tris-(trimethylsiloxy)silane, γ-acryloxypropyl-tris(trimethylsiloxy)silane, and 5-methacryloxypropyl-1,1,1-trimethyl-3,3,5,5-tetrakis(-trimethylsiloxy)trisiloxane; a wetting agent such as acrylic acid, methacrylic acid, N-vinyl pyrrolidone, itaconic acid and 2-hydroxyethyl methacrylate; a polyol polyacrylate such as ethylene glycol dimethacrylate, trimethylolpropane triacrylate and tetraethylene glycol dimethacrylate; and ester of acrylic acid and a monohydric alcohol having no more than 20 carbon atoms such as methyl methacrylate, isopropyl methacrylate and secondary butyl methacrylate; and a vinyl polymerization initiator selected from the group described above.

The copolymerization mixture will preferably contain from about 8% to 25% by weight of the polyfluoroalkyl acrylate, about 3% to 13% by weight of the silanol; from about 48% to about 55% by weight of an acrylalkylpolysiloxane; from 3% to about 15% by weight of a diacryloxyalkyl polysiloxane; from about 5% to about 12% by weight of a wetting agent, from about 5% to about 12% by weight of a polyol diacrylate crosslinker; and about 0.1% to about 1.5% by weight of a vinyl polymerization initiator. As an optional comonomer, up to about 10% by weight of an ester formed by the reaction of acrylic acid with a monohydric alcohol having no more than 20 carbon atoms may be included in the polymerization mixture.

The mixture, when stirred for about 20 minutes, is readily pourable into a preselected mold which may be constructed of polypropylene, polyethylene, nylon, Teflon ®, glass or aluminum having a molding surface coated with Teflon ®. The mold when filled with the copolymerization mixture is placed into a water or silicone bath which in turn is placed into an oven.

Alternatively, the resulting and readily pourable copolymerization mixture can be converted into a solid of the desired shape in a Teflon-coated aluminum tube. In any case, the selected mode will have been thoroughly cleaned, as with a dry brush and an anti-static air gun, to remove all particulates therefrom.

The filled molds are then placed in a water or silicone bath which in turn is placed into the oven. A very slight nitrogen flow is maintained through the oven.

The oven, containing the filled molds in the nitrogen environment, is heated to 35°–55° C. to commence polymerization of the copolymer and this temperature is maintained for a period of from 12 to 48 hours at which time the oven temperature is raised to between 56°–80° C. for an additional 18 to 48 hours to complete polymerization. When heating at 56°–80° C. is completed, the oven is cooled to room temperature and the copolymer solids, e.g., rods or blanks are removed from their molds (the polymerization tubes) by gently tapping the bottom of each tube.

The copolymer rods or blanks, thus removed from their respective molds, are annealed by placing them upon suitable trays which are then placed in an oven. This oven is then heated to a temperature of from 100° to about 150° C. for a period of from about 8 to about 36 hours. The duration of the annealing process is inversely related to the temperature selected.

After heating for the desired time, the oven is cooled to ambient temperature and the trays containing the annealed rods or blanks are removed from the oven and the annealed pieces are collected.

When contacts lenses or blanks are the ultimate objective, the rods will be machined to the desired diametric dimension, i.e., about ½ inch (13 mm) and then sliced into a plurality of buttons, each having a thickness of approximately 3/16 inch (4 mm).

It should be noted that the copolymerization mixture of the present invention can be tinted using any of the physiologically compatible color pigments or dyes currently used in PMMA contact lenses. Other dyes which are characterized as Food, Drug, and Cosmetic dyes and those denominated as Drug and Cosmetic dyes, which are physiologically compatible with the optic environment, can also be used. Thus lenses having blue, grey, green and brown tints as well as clear lenses can be produced by the present invention.

To further aid in the understanding of the present invention but not as a limitation thereupon, reference is made to the following Examples.

EXAMPLE 1

A copolymerization mixture is prepared by mixing the following comonomers in the relative weight ratios indicated in a plastic mixing container and stirring for twenty minutes: 48 parts of γ-methacryloxypropyl-tris-(trimethylsiloxy)silane; 19 parts of 1,1-dihydroperfluorobutyl methacrylate; 11 parts of methacrylic acid; 8 parts of bis(trimethylsiloxy)-γ-methacryloxypropylsilanol; 7 parts of 1,3-bis(γ-methacryloxypropyl)-

1,1,3,3-tetrakis(trimethylsiloxy)-disiloxane; 7 parts of ethylene glycol dimethacrylate and 0.25 parts of 2,2'-azobis(isobutyronitrile) as the polymerization initiator.

The resulting copolymerization mixture is readily poured into a plurality of thoroughly cleaned tubes, each of which presents a cylindrical mold cavity of approximately 15 mm in diameter and 42 mm in length. The filled tubes are then placed into a water or silicone bath which is, in turn, placed in an oven. A very slight positive nitrogen flow is maintained through the oven over the tubes. The oven containing the molds in the nitrogen environment is then heated to 35°–55° C. for 12–48 hours and thereafter the temperature is adjusted to 56°–80° C. for an additional 18–48 hours to complete polymerization. The bath is thereafter cooled to room temperature and the copolymer rods are removed from the molds. The copolymer rods are annealed by placing them flat in trays which are placed into an annealing oven. The oven is heated to 100°–150° C. for 8–36 hours whereupon the oven is cooled to ambient temperature. The trays containing the cooled annealed rods are thereafter removed from the oven and the rods are collected. Each rod is then machined to the desired diametric dimension, about 13 mm, and thereafter sliced into a plurality of buttons (lens blanks), each being approximately 4 mm thick. The resulting copolymer has a Shore "D" Hardness of 80 and a Dk of $119 \times 10^{-11}$. Contact lense prepared from the button have excellent optical properties and are readily wettable, durable and, resistant to warpage and surface deposits.

EXAMPLE 2

Standard Method for Determining Wetting Angle

Ten contact lens buttons (approximately 13 mm in diameter and 4 mm thick) are prepared by slicing one of the copolymer rods produced according to Example 1, "facing" one flat surface of each button with a diamond turning tool and polishing the faced surface to the degree normally acceptable by contact lens standards. After immersing the buttons in a contact lens soaking solution such as is available in SOCLENS ® from Alcon, as Wet-N-Soak ® from Alergan, or the like, for one week, each button is thoroughly washed with distilled water, and blotted dry. After this preparation, the buttons are subjected to wetting angle determinations using the Sessile-drop and Wilhemy plate techniques. Note that the smaller the "wetting angle" (in degrees), the better the tear pump exchange. The results obtained for the ten buttons of this example using the Wilhelmy receding angle test provided values between 10°–25° while measurements using the Sessile-drop method ranged from 20° to 52°.

EXAMPLE 3

The contact lens copolymer of Example 1 was tested for oxygen-permeability with a O$_2$-Permeometer Model 201T polarographic amplifier using the polarographic current. Permeability is expressed as the Dk unit with "D" being the diffusion coefficient and "k" being a solubility constant.

$$Dk = (y)10^{-11} (cm^2/sec)(ml\ O_2 \times ml \times mm\ Hg)$$

The contact lens is measured at 35° to 37° C. in an atmospherically controlled chamber. The results are reported in Table A, below:

TABLE A

| Lens Composition | O$_2$ Permeability (Dk $\times$ 10$^{-11}$)* |
|---|---|
| PARAGON 18 ® (Paragon PMMA) | <1 |
| PARAPERM ® O$_2$ (Paragon) | 15.6 |
| PARAPERM ® O$_2$ PLUS (Paragon) | 39.0 |
| PARAPERM ® EW (Paragon) | 56 |
| Example 1 | 119 |

*(cm$^2$/sec)(ml O$_2$/ml · mm Hg)

EXAMPLES 4–11

Following the general procedure as described in Example 1, copolymers are prepared for use in fabricating daily or extended wear contact lenses which, depending on the specific application, have a desired combination of mechanical strength, dimensional stability, optical clarity, oxygen permeability, wettability, and resistance to surface deposits. These copolymers are identified in Table B set forth below, parts are listed by weight percent.

TABLE B

| Monomer | Example 4 | 5 | 6 | 7 | 8 | 9 | 10 | 11 |
|---|---|---|---|---|---|---|---|---|
| MAPS | 45 | 50 | 54 | 50 | 50 | 50 | 51 | 49 |
| 3-FMA | 30 | 20 | 16 | 5 | 17 | 19 | 10 | 17 |
| BMPS | 5 | 8 | 7 | 6 | 6 | 6 | 11 | 6 |
| SiOH | 6 | 5 | 2 | 7 | 7 | 7 | 8 | 8 |
| MAA | 8 | 11 | 11 | 11 | 11 | 11 | 11 | 11 |
| EGDM | 6 | 6 | 7 | 10 | 8 | 7 | 7 | 9 |
| TEDM | — | — | — | — | — | — | — | — |
| MMA | — | — | 3 | — | 1 | — | 2 | — |
| i-PMA | — | — | — | 11 | — | — | — | — |
| t-BMA | — | — | — | — | — | — | — | — |
| AIBN | .25 | .25 | .35 | .35 | .35 | .25 | .35 | .25 |
| Hardness | 82 | 82 | 81 | 82 | 81 | 80 | 81 | 82 |
| Dk × 10$^{-11}$ | 101 | 101 | 110 | 86 | 99 | 113 | 103 | 99 |

Legend:
MAPS: methacryloxypropyl-tris-(trimethylsiloxy) silane;
3-FMA: 2,2,2-trifluoroethyl methacrylate;
BMPS: 1,3-bis(methacryloxypropyl)-1,1,3,3-tetrakis(trimethylsiloxy)-disiloxane
SiOH: bis(trimethylsiloxy)-γ-methacryloxypropylsilanol
MAA: methacrylic acid;
MMA: methyl methacrylate
7-FMA: 1,1-dihydroperfluorobutyl methacrylate;
FOSEM: 2-N—ethylperfluorooctanesulfonamidoethyl methacrylate;
EGDM: ethylene glycol dimethacrylate
TEDM: tetraethylene glycol dimethacrylate
t-BMA: tertiary butyl methacrylate
AIBN: 2,2'-azobis(isobutyronitrile)
NVP: N—vinylpyrrolidone Table B illustrates typical formulations used in the practice of this invention. All of the compositions gave copolymers which were readily lathe cut into optically clear contact lenses. In addition to their outstanding oxygen permeability, these contact lenses had the high degree of dimensional stability essential for good visual acuity. Further these contact lenses were all sufficiently hard to insure a high degree of scratch resistance and all were readily wettable with normal saline solution. The overall properties of these contact lenses make them eminently suitable for daily or extended wear by human patients.

EXAMPLES 12–17

Following the general procedure as described in Example 1, copolymers are prepared for use in preparing contact lens for comparative testing with the lens of the present invention. These copolymers are identified in Table C, below, in which the monomers are listed in weight percent.

TABLE C

| Monomer | Example | | | | | |
|---|---|---|---|---|---|---|
| | 12 | 13 | 14 | 15 | 16 | 17 |
| MAPS | 10 | 25 | 25 | 35 | 35 | 49 |
| 3-FMA | 35 | 30 | 30 | 17 | 30 | 18 |
| BMPS | — | — | — | — | — | 6 |
| 7-FMA | — | — | — | — | — | — |
| FOSEM | — | — | — | — | — | — |
| SiOH | — | — | — | — | — | 8 |
| MAA | 5 | 10 | 10 | 11 | 11 | 11 |
| EGDM | — | — | 5 | 7 | 7 | 8 |
| TEDM | 10 | 5 | — | — | — | — |
| MMA | 20 | 30 | 30 | 30 | 17 | — |
| i-PMA | — | — | — | — | — | — |
| t-BMA | 20 | — | — | — | — | — |
| NVP | — | — | — | — | — | — |
| AIBN | .25 | .25 | .25 | .35 | .35 | .35 |
| Hardness | 87.5 | 86 | 85 | 86 | 86 | 82 |
| Dk × 10$^{-11}$ | 7.0 | 14.6 | 13.8 | 23.3 | 31.8 | 100 |

Legend: See above listing.

All of the copolymers prepared from the comonomer compositions shown in Table C were readily lathe cut into optically clear contact lenses. Examples 13 and 14 each contained 30 parts of methyl methacrylate and 25 parts of γ-methacryloxypropyl-tris-trimethyl(siloxy)silane (MAPS) along with 5 parts of a crosslinking agent and 10 parts of methacrylic acid. It will be noted that the Dk×10$^{-11}$ values of the resulting contact lenses was less than 15. Increasing the MAPS concentration to 35 parts as shown in example 15 and 16 results in some improvement in oxygen permeability, but the Dk values were far below that shown in example 17 or in examples 4 through 11, all of which were prepared from comonomer compositions having at least 45 parts of MAPS and containing in addition to the monomers shown in examples 13 and 14, the comonomers bis(trimethylsiloxy)-γ-methacryloxypropylsilanol (SiOH) and 1,3-bis(γ-methacryloxypropyl)-1,1,3,3-tetrakis (trimethylsiloxy) disiloxane (BMPS). These results clearly show the importance of having at least 45 parts of MAPS in the comonomer compositions and the contribution of the SiOH and BMPS comonomers.

EXAMPLES 18-26

Following the general procedure as described in Example 1, copolymers are prepared for use in fabricating daily or extended wear contact lenses which, depending on the specific application, have a desired combination of mechanical strength, dimensional stability, optical clarity, oxygen permeability, wettability, and resistance to surface deposits. These copolymers are identified in Table D set forth below, parts are listed by weight percent.

TABLE D

| Monomer | Example | | | | | | | | |
|---|---|---|---|---|---|---|---|---|---|
| | 18 | 19 | 20 | 21 | 22 | 23 | 24 | 25 | 26 |
| MAPS | 49 | 50 | 49 | 49 | 49 | 49 | 49 | 55 | 62 |
| 3-FMA | — | 15 | — | 17 | 17 | — | — | 16 | 8 |
| BMPS | 6 | 7 | 6 | 6 | 6 | 6 | 6 | 7 | 4 |
| 7-FMA | 15 | — | — | — | — | 19 | 8 | — | — |
| FOSEM | — | — | 15 | — | — | — | — | — | — |
| SiOH | 8 | 8 | 8 | 8 | 8 | 8 | 8 | 7 | 2 |
| MAA | 11 | 11 | 11 | 11 | 6 | 11 | 11 | 10 | 11 |
| EGDM | 7 | 8 | 7 | 8 | 8 | 7 | 10 | 5 | 9 |
| TEDM | — | — | — | — | — | — | — | — | — |
| MMA | 4 | 1 | 4 | 1 | — | — | — | — | 4 |
| i-PMA | — | — | — | — | — | — | 8 | — | — |
| t-BMA | — | — | — | — | — | — | — | — | — |
| NVP | — | — | — | — | 5 | — | — | — | — |
| AIBN | .35 | .35 | .35 | .35 | .35 | .25 | .25 | .25 | .35 |
| Hardness | 81 | 81 | 80 | 81 | 81 | 80 | 82 | 80 | 80 |
| Dk × 10$^{-11}$ | 114 | 102 | 102 | 93 | 93 | 122 | 100 | 126 | 112 |

Legend: See above listing.

The copolymer compositions shown in Table D illustrate the use of additional polyfluoroalkyl acrylates and varying concentrations of the other comonomers. Contact lenses lathe cut from the resulting copolymers were optically clear, readily wettable, scratch resistant and had a high degree of oxygen permeability.

Following the general procedures of Example 1, copolymers are prepared of other comonomers, which, depending on the specific desired balance of properties of mechanical strength, dimensional stability, resistance to warpage, optical characteristics, oxygen permeability, wettability and resistance to surface deposits, are suitable for use in fabricating contact lenses, all within the spirit of the present invention.

Referring to Tables B and D, the following substitutions can be made for all or part of the indicated monomers without departing from the present invention: Bis(trimethylsiloxy)-methacryloxymethylsilanol or methyl-(trimethylsiloxy)-γ-methacryloxypropylsilanol for bis-(trimethylsiloxy)-γ-methacryloxypropylsilanol; methacryloxymethyl-tris-(trimethylsiloxy)silane or γ-acryloxymethyl-tris-(triethylsiloxy)silane for γ-methacryloxypropyl-tris-(trimethylsiloxy)silane; 1,3-bis(methacryloxymethyl)-1,1,3,3-tetrakis(trimethylsiloxy) disiloxane or 1,3-bis-(γ-methacryloxypropyl-1,1-dimethyl-3,3-bis(trimethylsiloxy)disiloxane for 1,3-bis(γ-methacryloxypropyl)-1,1,3,3-tetrakis(trimethylsiloxy)disiloxane; methyl acrylate, ethyl methacrylate or 2-ethoxyethyl methacrylate for methyl methacrylate; acrylic acid, acrylamide or 2-hydroxyethyl methacrylate for methacrylic acid; and 1,3-propylene diacrylate or tetraethylene glycol dimethacrylate for ethylene glycol dimethacrylate.

Various acceptable alternative initiators have been described above with the preferred initiators being shown in Tables B and D.

EXAMPLE 27

Representative lenses produced according to the present invention were subjected to microbiological testing for toxicity and physiological biocompatibility as recommended in the FDA Guidelines for "Toxicological Testing of New Contact Lenses and Soaking/Wetting Solutions Used With New Contact Lenses". The specimens met the FDA guidelines.

EXAMPLE 28

Copolymer formulations of the present invention were subjected to physical and chemical testing. The formulations were found to be chemically stable and provided the following typical physical characteristics.

TABLE E

| Properties | Specification | Test Results |
| --- | --- | --- |
| Hardness | ANSI/ASTM D2240-75 | D78-D85 |
| Scratch resistance | ANSI Z80.6; 4.2 | $2 < x < 3$ |
| Absorption (normal saline) | ANSI Z80.6; 4.6.1 | $<2\%$ |
| Absorption (distilled water) | ANSI Z80.6; 4.6.2 | $<2\%$ |
| Wetting angle | Wilhemy procedure | $10°-25°$ |
|  | Sessile-drop | $15°-25°$ |
| Gas permeability | $O_2$ Permeometer Model 201T $Dk = (y) \cdot 10^{-11}$ $cm^2/ml \, O_2/sec\text{-}ml\text{-}mmHg$ at 37° C. by polarography | $Dk = 70\text{-}150 \cdot 10^{-11}$ |
| Shelf life | ANSI Z80.6; 4.4 | Unlimited |
| Luminous transmittance (colorless lenses) (370-740 nm) | ANSI Z80.6; 4.5 | $>90\%$ |
| Heat distortion | ANSI/ASTM D648 | $>60°$ C. |
| Dimensional stability | ANSI/ASTM D756 | $<1\%$ |
| Refractive index | ANSI/ASTM D542 | 1.40-1.50 (Nd at 25° C.) |
| Tensile strength | ANSI/ASTM D638 | $1\text{-}4 \times 10^5$ psi |
| Flexural strength | ANSI/ASTM D790 | $2\text{-}6 \times 10^5$ psi |

EXAMPLE 29

Contact lenses formulated from the copolymer formulations of the present invention were shaped to provide spherical, toric, biotoric, aspheric and bifocal characteristics. The lenses provided base curves of 6.5 to 9.0 mm, diameters of 7 to 11.5 mm and thicknesses of 0.05 to 0.70 mm to provide custom corneal fittings.

These lenses are found to conform to ANSI Z80.2 prescription requirements for first quality contact lenses and are capable of providing correction of refractive error in patients with non-therapeutic eyes having ametropias, including myopia, hyperopia and those with astigmatism.

From the foregoing, it becomes apparent that a new and useful copolymer composition, method for handling said copolymers to mold or cast them into optical lenses or blanks from which contact lenses or the like may be shaped, and the buttons and lenses resulting therefrom have been herein described and illustrated which fulfill all of the aforesaid objectives in a remarkably unexpected fashion, it being understood that such modifications, alterations and adaptations as may readily occur to an artisan having the ordinary skills to which this invention pertains are intended within the spirit of the present invention which is limited only by the scope of the claims appended hereto.

Accordingly, what is claimed is:

1. A copolymer composition, especially suited for fabricating optical lenses, comprising a copolymer of copolymerized comonomers containing:

(a) about 45% to about 65% by weight of a siloxy substituted ester of acrylic or methacrylic acid having the structure:

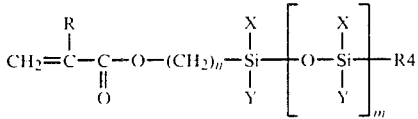

wherein
R = CH$_3$— or H—;
X = C$_1$-C$_6$ alkyl, cyclohexyl, phenyl or Z;
Y = C$_1$-C$_6$ alkyl, cyclohexyl, phenyl or Z;
Z =

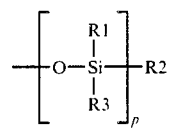

R1 = C$_1$-C$_6$ alkyl, cyclohexyl, or phenyl; m = 1-3;
R2 = C$_1$-C$_6$ alkyl, cyclohexyl, or phenyl; n = 1-5;
R3 = C$_1$-C$_6$ alkyl, cyclohexyl, or phenyl; p = 1-3;
R4 = C$_1$-C$_6$ alkyl or cyclohexyl;

(b) about 3% to about 35% by weight of a polyfluoroalkyl acrylate having no more than 20 fluorine atoms and the structure:

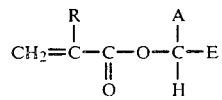

wherein:
R = H or CH$_3$;
A = H or E; and
E = a polyfluoroalkyl group;

(c) about 1% to about 15% by weight of an acryloxyalkylsilanol having the structure:

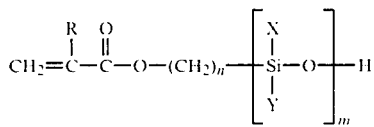

wherein:
R=CH₃— or H—;
X, Y=C₁-C₆ alkyl; phenyl or Z;
Z=

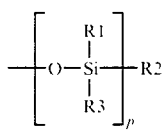

n = 1-5
m = 1-3
p = 1-3
R1 = C₁-C₆ alkyl, cyclohexyl, or phenyl;
R2 = C₁-C₆ alkyl, cyclohexyl, or phenyl;
R3 = C₁-C₆ alkyl, cyclohexyl, or phenyl;
(d) about 2% to about 20% by weight of a polyacryloxyalkylpolysiloxane having the structure:

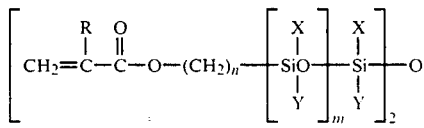

wherein:
R=CH₃— or H—;
m=0-3;
n=1-5;
X=C₁-C₆ alkyl, cyclohexyl, phenyl or Z;
Y=C₁-C₆ alkyl, cyclohexyl, phenyl or Z; and
Z=

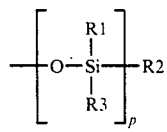

p=1-3;
R1 = C₁-C₆ alkyl, cyclohexyl, or phenyl;
R2 = C₁-C₆ alkyl, cyclohexyl, or phenyl; and
R3 = C₁-C₆ alkyl, cyclohexyl, or phenyl;
(e) about 2% to 15% of a polyol polyacrylate;
(f) about 2% to about 15% of an ethylenically unsaturated polymerizable wetting agent; and
(g) zero to about 15% by weight of an acrylic acid ester of a monohydric alcohol having no more than 20 carbon atoms.

2. A copolymr composition according to claim 1 containing from about 48% to about 55% by weight of said siloxy substituted ester of acrylic or methacrylic acid.

3. A copolymer composition according to claim 2 in which said siloxy substituted ester is selected from the group consisting of γ-methacryloxypropyl-tris(trimethylsiloxy)-silane; γ-acryloxypropyl-tris(trimethylsiloxy) silane; and 5-methacryloxypropyl-1,1,1-trimethyl-3,3,5,5-tetrakis(trimethylsiloxy)trisiloxane.

4. A copolymer composition according to claim 1 containing from about 8% to about 25% by weight of said polyfluoroalkyl acrylate.

5. A copolymer composition according to claim 4 in which said polyfluoroalkyl acrylate is selected from the group consisting of: 2,2,2-trifluoroethyl methacrylate, hexafluoroisopropyl methacrylate; 1,1-dihydroperfluoro 2,2-dimethylpropyl acrylate; 1,1-dihydroperfluorobutyl methacrylate; 1-trifluoromethylethyl acrylate; nonafluorocyclohexyl acrylate; 1,1-dihydroperfluorooctyl methacrylate; 2,2,3,3-tetrafluoropropyl methacrylate; 1,1-dihydroperfluoropropyl acrylate; 1,1-dihydroperfluorononyl methacrylate; 2-(N-ethylperfluorooctanesulfamido)ethyl methacrylate; and 2,2,2-trifluoroethyl-α-carboxymethyl acrylate.

6. A copolymer composition according to claim 1 containing from about 3% to about 13% by weight of said acryloxyalkylsilanol.

7. A copolymer composition according to claim 6 in which said acryloxyalkylsilanol is selected from the group consisting of bis(trimethylsiloxy)-γ-methacryloxypropylsilanol, methyl (trimethylsiloxy)-methacryloxymethylsilanol, methyl(trimethylsiloxy)-β-methacryloxyethylsilanol, methyl(trimethylsiloxy)-γ-methacryloxypropylsilanol, bis(trimethylsiloxy)-β-methacryloxyethylsilanol, bis(trimethylsiloxy)-methylacryloxymethylsilanol, (trimethylsiloxy)-(pentamethyldisiloxanyl)-methacryloxymethylsilanol, (trimethylsiloxy)-(pentamethyldisiloxanyl)-β-methacryloxymethylsilanol, and (trimethylsiloxy)-(pentamethyldisiloxanyl)-γ-methacryloxypropylsilanol.

8. A copolymer composition according to claim 1 containing from about 3% to about 15% by weight of said polyacryloxyalkylpolysiloxane.

9. A copolymer composition according to claim 8 in which said polyacryloxyalkylpolysiloxane is selected from the group consisting of 1,3-bis(methacryloxypropyl)-1,1,3,3-tetrakis (trimethylsiloxy) disiloxane, 1,3-bis(acryloxymethyl)-1,1,3,3-tetrakis (trimethylsiloxy) disiloxane, 1,3-bis(methacryloxypropyl)-1,1,3,3-tetrakis (triethylsiloxy) disiloxane, and 1,5-bis(methacryloxymethyl)-1,1,3,3,5,5-hexa (trimethylsiloxy) trisiloxane.

10. A copolymer composition according to claim 1 containing from about 5% to about 12% by weight of said polyol polyacrylate.

11. A copolymer composition according to claim 10 in which said polyol polyacrylate is selected from the group consisting of ethylene glycol dimethacrylate, trimethylolpropane triacrylate, diethyleneglycol dimethacrylate, glycerol trimethacrylate and tetramethyleneglycol dimethacrylate.

12. A copolymer composition according to claim 1 containing from about 5% to about 12% by weight of said ethylenically unsaturated polymerizable wetting agent.

13. A copolymer composition according to claim 12 in which said wetting agent is selected from the group consisting of acrylic acid; methacrylic acid; itaconic acid; N-vinylpyrrolidone; hydroxyethyl methacrylate; N-(1,1-dimethyl-3-oxybutyl)-2-acrylamide; glycerol monomethacrylate; N,N-dimethylaminomethyl methacrylate; 2-methoxyethyl acrylate; N,N-dimethylacrylamide; acrylamide and 2-carboxyethyl methacrylate.

14. A copolymer composition according to claim 1 containing up to about 10% by weight of an acrylic acid ester of monohydric alcohol.

15. A copolymer composition according to claim 14 in which said acrylic acid ester is selected from the group consisting of methyl methacryate; stearyl methacrylate; cyclohexyl acrylate; isopropyl methacrylate; isoborynl acrylate; cyclopentadienyl methacrylate; phenylacrylate; benzyl methacrylate; 2-methyl-propyl methacrylate; isopropyl acrylate and methyl-α-carbomethoxy acrylate.

16. A copolymer composition according to claim 8 containing from about 5% to about 12% by weight of said polyol polyacrylate.

17. A copolymer composition according to claim 16 in which said polyol polyacrylate is selected from the group consisting of ethylene glycol dimethacrylate, trimethylolpropane triacrylate, diethyleneglycol dimethacrylate, glycerol trimethacrylate and tetramethyleneglycol dimethacrylate.

18. A copolymer composition according to claim 17 in which said polyacryloxyalkylpolysiloxane is selected from the group consisting of 1,3-bis(methacryloxypropyl)-1,1,3,3-tetrakis (trimethylsiloxy)disiloxane, 1,3-bis(acryloxymethyl)-1,1,3,3-tetrakis(trimethylsiloxy)-disiloxane, 1,3-bis(methacryloxypropyl)-1,1,3,3-tetrakis(triethylsiloxy)disiloxane, and 1,5-bis(methacryloxymethyl)-1,1,3,5,5-hexa (trimethylsiloxy) trisiloxane.

19. A copolymer composition according to claim 1 containing from about 0.05% to about 2% by weight of an initiator selected from the group consisting of 2,2'-azobis(isobutyronitrile); 2,2'-azobis(2,4-dimethylvaleronitrile); 2,2'-azobis (methylbutyronitrile)-acetyl peroxide; lauroyl peroxide; benzoyl peroxide; tertiary-butyl peroxypivalate; diisopropyl peroxycarbonate; tertiary-butyl peroctoate; methyl ethyl ketone peroxide; di(2-phenoxyethyl) peroxydicarbonate; and di(2-phenoxyethyl)methyl ethyl ketone peroxide.

20. A copolymer composition according to claim 1 containing by weight percent: from about 48% to about 55% of a siloxy substituted ester of acrylic or methacrylic acid; from about 8% to about 25% of a polyfluoroalkyl acrylate; from about 3% to about 13% of an acryloxyalkylsilanol; from about 3% to about 15% of a polyacryloxyalkylpolysiloxane; from about 5% to about 12% of a polyol polyacrylate; from about 5% to about 12% of one or more polymerizable, ethylenically unsaturated monomeric wetting agents; up to 10% of an acrylic acid ester of a monohydric alcohol; and from 0.1% to about 1.5% of a free radical polymerization initiator.

21. A copolymer composition according to claim 20 containing by weight percent: from about 48% to about 55% of methacryloxypropyltris-(trimethylsiloxy) silane; from about 8% to about 25% of a monomer selected from the group consisting of 2,2,2-trifluoroethyl methacrylate, 1,1-dihydroperfluoro methacrylate, and 2-N-ethylperfluorooctanesulfonamidoethyl methacrylate; from about 3% to about 13% of bis(trimethylsiloxy)-γ-methacryloxypropylsilanol; from about 3% to about 15% of 1,3-bis(methacryloxypropyl)-1,1,3,3-tetrakis(trimethylsiloxy) disiloxane; from about 5% to about 12% of ethylene glycol dimethacrylate; from about 5% to about 12% of methacrylate acid; up to 10% of methylmethacrylate of N-vinyl pyrrolidone; and from 0.1% up to about 1.5% of 2,2'-azobis(isobutyronitrile).

22. As a new article of manufacture, an optical lens fabricated from the copolymer of copolymerized comonomers of claim 1.

23. An article of manufacture according to claim 22 comprising an extended wear contact lens.

24. As a new article of manufacture, a contact lens button fabricated from the copolymer of copolymerized comonomers of claim 1.

25. As a new article of manufacture, a contact lens formed from the button of claim 24.

26. As a new article of manufacture, an optical lens fabricated from the copolymer of copolymerized comonomers of claim 20.

27. An article of manufacture according to claim 26 comprising an extended wear contact lens.

28. As a new article of manufacture, a contact lens button fabricated from the copolymer of copolymerized comonomers of claim 20.

29. As a new article of manufacture, a contact lens formed from the button of claim 28.

30. As a new article of manufacture, an optical lens fabricated from the copolymer of copolymerized comonomers of claim 21.

31. An article of manufacture according to claim 30 comprising an extended wear contact lens.

32. As a new article of manufacture, a contact lens button fabricated from the copolymer of copolymerized comonomers of claim 21.

33. As a new article of manufacture, a contact lens formed from the button of claim 32.

* * * * *